United States Patent [19]

Baensch et al.

[11] 4,126,544
[45] Nov. 21, 1978

[54] PROCESS AND APPARATUS FOR REMOVING IMPURITIES DISSOLVED IN WATER

[75] Inventors: Ulrich Baensch, Melle; Luis-Alberto Benedetto-Castro, Schlitz-Hallenburg, both of Fed. Rep. of Germany

[73] Assignee: Tetra Werke, Dr. rer. nat. Ulrich Baensch G.m.b.H., Melle, Fed. Rep. of Germany

[21] Appl. No.: 744,826

[22] Filed: Nov. 24, 1976

[30] Foreign Application Priority Data

Nov. 26, 1975 [DE] Fed. Rep. of Germany ....... 2553050

[51] Int. Cl.$^2$ .............................................. C02C 1/04
[52] U.S. Cl. .......................................... 210/11; 210/16; 210/17; 210/18; 210/151; 210/199; 210/206; 210/218; 210/DIG. 28
[58] Field of Search .................. 210/17, 18, 150, 151, 210/639, DIG. 28, 11, 16, 199, 205, 206, 218, 220

[56] References Cited

U.S. PATENT DOCUMENTS

| | | | |
|---|---|---|---|
| 2,014,431 | 9/1935 | Foster | 210/150 |
| 2,188,162 | 1/1940 | Schlhoff | 210/11 |
| 2,992,986 | 7/1961 | Ingram | 210/17 |
| 3,112,261 | 11/1963 | Porter | 210/11 |
| 3,232,865 | 2/1966 | Quinn | 210/11 |
| 3,329,271 | 7/1967 | Ward | 210/150 |
| 3,494,463 | 2/1970 | Vermette | 210/151 |
| 3,546,111 | 12/1970 | Busch | 210/18 |
| 3,654,147 | 4/1972 | Levin | 210/16 |
| 3,751,339 | 8/1973 | Suzuki | 195/96 |
| 3,829,377 | 8/1974 | Hashimoato | 210/11 |
| 3,871,999 | 3/1975 | Torpey | 210/16 |
| 3,964,998 | 6/1970 | Barnard | 210/16 |

OTHER PUBLICATIONS

"Anaerobic Filter Treatment of Pharmaceutical Waste", Journal WPCF, Jennett, Jan 1975, pp. 104–108, 119–121.
Biological Kinetics of Suspended Growth Dentrification, Stensel, J.W.P.C.F., vol. 45, No. 2, Feb. 1973, pp. 249–261.
Jeris, Biological Dentrification of Effluents in Fluidized Bed, Mar. 1972, pp. 7–11.

Primary Examiner—Charles N. Hart
Assistant Examiner—Ernest G. Therkorn
Attorney, Agent, or Firm—Cushman, Darby & Cushman

[57] ABSTRACT

There are disclosed a process for removing impurities dissolved in water, and more particularly organic nitrogen compounds, nitrates, nitrites and ammonium compounds utilizing biological processes, comprising the steps of passing in the presence of a normal atmosphere the water to be purified in downwardly flowing manner through a system which ensures ammonification and nitrification, then passing said water in the presence of a nitrogen atmosphere through a system which physically expels oxygen, then passing said water once again in the presence of a nitrogen atmosphere through a system which biologically reduces nitrates, and finally after draining off the gases formed from the impurities, removing purified water and an apparatus for carrying out said process.

15 Claims, 7 Drawing Figures

PROCESS AND APPARATUS FOR REMOVING IMPURITIES DISSOLVED IN WATER

BACKGROUND OF THE INVENTION

The invention relates to a process for removing impurities dissolved in water, and more particularly organic nitrogen compounds, nitrates, nitrites and ammonium compounds utilising biological processes and to an apparatus for performing this process.

Processes for the purification of water by removing the above-mentioned impurities have hitherto only been known in connection with the slow process of natural ecological systems (Kusnezow, S. I. "Die Rolle der Mikroorganismen im Stoffkreislauf der Seen", 1959, VEB, Deutscher Verlag der Wissenschaften, Berlin) and have correspondingly been used hitherto in the case of so-called slow filters in connection with hydro-economy for obtaining drinking water.

Individual stages of these processes are also carried out in laboratory tests for micro-biological teaching purposes as a proof of the physiological metabolism of mirco-organisms (Drews. G., 1968, "Mikrobiologisches Praktikum fur Naturwissenschaftler." Springer-Verlag, Berlin, Heidelberg, New York;) for water-purification purposes in the activated sludge of sewage treatment plants; (REHM, H. J., "Einfuhrung in die industrielle Mikrobiologie." 1971, Springer-Verlag, Berlin, Heidelberg, New York;) and in aquarium technology: HIRAYAMA, K., "Studies on Water control by filtration through sand bed in a marine aquarium with closed circulating system, 1965, I. Oxygen consumption during filtration as an index in evaluating the degree of purification of breeding water."; Bull. Jap. Sec. Sei. Fish. 31, pp. 977-982 and SAEKI, A., 1958, "Studies on fish culture in filtered closed-circulation aquaria. I. Fundamental theory and system design Standards"; Bull. Jap. Soc. Sei. Fish. 23, pp. 684-965 (Translation in D. Res. Bd. Canada 1964).

With the exception of slow filters the processes hitherto used for water purification purposes are not able to decompose nitrates, so that the water cannot be used as drinking water. Processes involving the use of slow filters ensure an adequate purification of the water through the removal of nitrates but they do not satisfy economic requirements because the purification process takes an unsatisfactorily long time and is also comparatively expensive. Therefore this process cannot be economically used for solving the problem arising in connection with the increased water consumption in all industrial countries.

On the basis of the above prior art, the problem of the present invention is to provide a process which compared with the hitherto known processes of this type can be operated in a shorter time with a lower energy consumption and with minimum mechanical expenditure, together with an apparatus for performing this process.

DETAILED DESCRIPTION OF THE INVENTION

According to the present invention this problem is solved in that in the presence of a normal atmosphere the water to be purified is passed in downwardly flowing manner through a system which ensures ammonification and nitrification, then in the presence of a nitrogen atmosphere it is passed through a system which physically expels oxygen and then once again in the presence of a nitrogen atmosphere is passed through a system which biologically reduces nitrates, and after draining off the gases formed from the impurities, purified water is removed.

For the performance of this process is particularly suitable an apparatus which is characterised by
(a) an ammonification and nitrification device,
(b) a device for physically expelling oxygen, and
(c) a device for biologically reducing nitrates
whereby these devices are interconnected in such a way that the water to be purified flows downwards and by feed discharge and intermediate lines.

The ammonification and/or nitrification which is first performed according to the invention is brought about in that the water to be purified is treated in downwardly flowing manner in a system in which there is normal atmosphere. When reference is made in the present invention to normal atmosphere, this must be understood in the widest sense. Thus, this need not be a gaseous medium of normally composed air consisting of approximately 21 volume % oxygen, 78 volume % nitrogen together with inert gases, carbon-dioxide etc. as the residue. There can be certain variations in the composition of the air or in addition to the above-mentioned constituents it can contain random other gases which do not impair, or only insignificantly impair the ammonification and nitrification process. Thus, for example, the nitrogen can partly or completely be replaced by other inert gases such as methane etc. Therefore, it need only be an atmosphere which normally ensures the chemical or biochemical results serving as a basis for ammonification and nitrification. These results are well known to the expert so that it is up to him to choose the most suitable normal atmosphere as a function of the type of impurities in the water to be treated.

The ammonification and nitrification processes are to be considered as preliminary stages of the complete nitrogen circuit according to the invention and are absolutely necessary for the completion thereof (reduction of nitrate to nitrogen). These preliminary stages are also important in the tank containing activated sludge in sewage treatment plants. Ammonification is a reaction of the nitrogen contained in organic compounds to ammonia-nitrogen, which subsequently during the nitrification process during oxidation is initially converted into nitrite nitrogen and then into nitrate nitrogen. Therefore nitrification comprises an oxidation of ammonia resulting from the decomposition of nitrogen-containing biological substances to nitrate with the aid of aerobic, so-called nitrifying bacteria (nitrificants). It is therefore clear that the normal atmosphere within the meaning of the present invention must always contain oxygen in such a quantity that nitrification takes place to the desired extent. Obviously in the case of water which is made impure solely by nitrates, the ammonification and nitrification process stage is superfluous. However, this would represent an exception because water to be purified and which is to be supplied to the drinking water mains generally contains not only nitrates but also random organic nitrogen compounds, nitrites, ammonium compounds and compounds containing nitrogen in a different chemically bonded form.

Ammonification and nitrification take place particularly rapidly and completely in a system containing a porous body inoculated with an ammonifying or nitrifying bacterial culture. This body is preferably enclosed in a container having feed and discharge lines. The porous bodies can be made from cotton wool, foam material, felt or other inert materials and should be no higher than 5 cm because, for example, during nitrification there is a gas exchange in the vicinity of the surface. The water which flows in at the top is distributed over the surface of the first porous body and after penetrating the same on the surface of the second body and so on. The porous bodies are preferably 3 cm apart. A plurality of said bodies can be arranged in a row, whereby it is particularly advantageous if the porous bodies are inoculated with solutions which aid the ammonification and nitrification processes. When performing the process according to the invention, it has proved particularly advantageous for inoculation to take place with a solution preservable at 1.5° to 3° C. and containing 10 liters of mains water, 500 g of pond sludge, 10 g $(NH_4)_2SO_4$, 10 g $NaNO_2$, 5 g $K_2HPO_4$, 20 g NaCl, 50 g $CaCO_3$, 2 g $MgSO_4$, 0.5 g Fe $SO_4$ and 10 g $CO(NH_2)_2$, which following adjusting of the pH value to 6.5 was incubated for 10 days accompanied by ventilation.

It is also advantageous if the surfaces of the porous bodies are inclined within the system which ensures nitrification and ammonification, whereby the water to be treated flow downwards in and on the entire porous body, thereby flowing onto a new porous surface which slopes in the opposite direction to the preceding porous surface. Due to the arrangement of a plurality of porous bodies, the water to be treated flows over a long contact path on the porous substance which aids ammonification and nitrification in a comparatively small container.

At the end of ammonification and nitrification the water to be treated passes into a system which physically expels oxygen and which operates in the presence of a nitrogen atmosphere. Within the meaning of the present invention, the term nitrogen atmosphere must be understood in the widest sense. It can indeed be an atmosphere which comprises all or mostly nitrogen. However, it is decisive for this nitrogen-containing atmosphere to be suitable to remove the oxygen physically dissolved in the water to be purified to such an extent that the denitrification or nitrate breathing which subsequently takes place in the biologically reducing system in performed to a satisfactory extent. Therefore, this does not preclude the nitrogen atmosphere containing some oxygen. What is vital is that due to the dynamic equilibrium of oxygen in the atmosphere to oxygen in the water, there is such an extensive transfer of oxygen from the water into the atmosphere that the residual oxygen remaining in the water does not impair or only insignificantly impairs nitrate breathing. It is obvious that this gas exchange takes place particularly completely if the nitrogen atmosphere contains no oxygen. The oxygen is physically removed particularly effectively if the water to be purified is passed through a nitrogen atmosphere in the form of a nitrogen/hydrogen or nitrogen/methane atmosphere. This preferred measure also shows that there must be nitrogen in the nitrogen atmosphere, but it can also be partly replaced by those gases which are not prejudicial to the physical removal of the oxygen from the water to be treated.

The oxygen is physically expelled from the impure water in particularly advantageous manner by using a device having a row of flat containers with overflows arranged perpendicular to the flow of water or a row of surfaces which are inclined relative to the flow of water.

The flat containers are preferably constructed in such a way that they can be filled with water up to a height of 3 to 6 cm. When the water level reaches this height the water flows through an overflow into the next container and on reaching the given height again, it flows into the next container and so on.

After an adequate amount of oxygen has been removed from the water, it is passed into a system for biologically reducing nitrates in the presence of a nitrogen atmosphere. Here again, it is a nitrogen atmosphere such as was explained hereinafter relative to the system for physically expelling oxygen. The denitrification or nitrate breathing process takes place in this system. This is understood to mean the conversion of nitrates into nitric oxide, dinitric oxide or free nitrogen by bacteria (e.g. Pseudomonas stutzeri and Micrococcus denitrificans) accompanied by an extensive or complete exclusion of air. Denitrification bacteria are anaerobic bacteria which use the oxygen freed during the reduction of nitrates as a hydrogen acceptor for decomposing organic nutrients. The energy obtains maintains the metabolism.

In order to convert the nitrate dissolved in the water to be purified into the said gaseous secondary products by reduction, it is necessary to work in a nitrogen atmosphere which is preferably in the form of a nitrogen/hydrogen or nitrogen/methane atmosphere, whereby optionally oxygen still dissolved in small quantities is completely removed and finally the nitrate breathing of anaerobic bacteria cultivated in the system is made possible. These bacteria form water by the transfer of oxygen ions to the oxygen contained in the nitrate, and consequently release sufficient oxygen for breathing purposes. After splitting off the nitrate molecule a gaseous secondary product is left behind which is normally gaseous nitrogen which escapes into the air.

Denitrification or nitrate breathing can be performed particularly successfully if the system which biologically reduces the nitrates contains porous bodies colonised with special bacteria. These porous bodies can once again be made from cotton wool, foam material, felt or other inert materials and should be no higher than 5 cm because gas exchange takes place in the vicinity of the surface. The water from the oxygen expelling system than flows in uniformly distributed manner on the surface of the first porous body and after penetrating the same over the second porous body and so on. These bodies must be 3 cm apart, but for the gas atmosphere must have a minimum spacing of 1 cm. As the part reducing the biological nitrate gives off basic substances during the performance of the reduction, its length must be limited. When passing through the water must not exceed a pH value of max. 8.5. Should this, however, take place, it leads to an inhibition of bacterial activity. As during nitrate reduction, nitrite is obtained as an intermediate it must always be ensured that the water to be treated only leaves the apparatus used for performing the process according to the invention when no further dissolved nitrogen compounds are left behind.

The porous bodies advantageously used for performing the denitrification or nitrate breathing process are especially effective if previously treated with a suitable nutrient solution for the denitrifying bacteria. A nutrient solution for denitrifying bacteria according to Trautwein is particularly suitable and has the following composition:

1.0 g Potassium nitrate ($KNO_3$),
0.1 g Sodium hydrogen phosphate ($Na_2HPO_4 \cdot 1 H_2O$),
2.0 g Sodium thiosulphate ($Na_2S_2O_3 \cdot 5 H_2O$), 0.1 g Sodium hydrogen carbonate (NaHCO$_3$),
0.1 g Magnesium chloride (MgCl$_2$ . 6 H$_2$O),
0.1 g Ammonium chloride (NH$_4$Cl),
5.0 ml of a solution of trace elements and 1000 ml of distilled water (pH value 7).

The solution of the trace elements in 1000 ml of distilled water contains:

1000 mg Iron III-citrate,
10 mg Manganese chloride (MnCl$_2$ . 4 H$_2$O),
5 mg Zinc chloride (ZnCl$_2$),
2.5 mg Potassium bromide (KBr),
2.5 mg Potassium iodide (KJ),
5.0 mg Cobalt chloride (CoCl$_2$),
0.5 mg Tin chloride (SnCl$_2$ . 2 H$_2$O),
0.5 mg Barium chloride (BaCl$_2$) and
10 mg Boric acid (H$_3$BO$_3$).

This solution of the trace elements is used in a dilution of 1:100 to 1:500 relative to the nutrient solution.

The system which physically expels the oxygen in the presence of a nitrogen atmosphere and the following system which biologically reduces nitrates once again in the presence of a nitrogen atmosphere can be installed in this sequence in a closed tube. For both systems, however, it is decisive that a gas phase enters through the lower cover which is a nitrogen atmosphere within the meaning of the present invention and which more particularly applies for a nitrogen/hydrogen or a nitrogen/methane mixture or a pure nitrogen gas.

If when performing the process of the invention the above-indicated problem of an elevated pH value occurs so that denitrification does not take place to a satisfactory extent, an advantageous development of the process of the invention provides an efficient solution. It is thus advantageously possible to arrange in series a plurality of systems which biologically reduce nitrates following a prior neutralisation. The water derived from the system which biologically reduces nitrates and which contains alkaline substances is treated with carbon-dioxide, the latter is then removed and then for the completion of biological reduction the water is again fed to a system which biologically reduces nitrates in the presence of a nitrogen atmosphere and accompanied by the exclusion of carbon-dioxide. The number of system changes (biologically reducing system/neutralising system) depends on the degree of pollution of the water to be purified.

Neutralisation with carbon-dioxide when performing the process according to the invention has admittedly proved particularly advantageous. However, if falls within the average non-inventive activity of the expert to use random neutralising media which do not have a disadvantageous influence on the following process involving biological reduction of the nitrates.

A series of flat containers is advantageously used in the chemically neutralising system and these were mentioned during the description of the system which physically expels oxygen. This system must be separated from the preceding systems by a water column (water seal or syphon). It can be incorporated into a closed tube into whose lower part carbon-dioxide can continuously be introduced, which escapes from the upper part via an outlet, e.g. a valve, without being able to penetrate into the system which biologically reduces the nitrates.

It has proved to be particularly advantageous to arrange the three last-described systems (system which physically expels oxygen, system which biologically reduces nitrates and system which effects a chemical neutralisation) in a cascade system which is known in the art. In such a cascade system several different surfaces oppose the free fall of the water which increases the water surface and therefore slows down flowing through.

However, it must be ensured that the different atmospheres used in the said systems are strictly separated from one another.

The following comments serve to explain the technological bases of the present invention:

In the ammonification and nitrification stage which takes place in a normal atmosphere, e.g. organic nitrogen compounds are converted via ammonium compounds and nitrites into nitrates. The physical explusion of the oxygen in the presence of a nitrogen atmosphere from the water to be purified means that the water is prepared in an ideal manner for the effective performance of the subsequent biological nitrate breathing process. The fact that the oxygen expulsion and biological nitrate breathing stages must be performed in the presence of a nitrogen-containing atmosphere is important for solving the fundamental problem of the invention. It is equally important that the water is treated in a downwardly flowing manner. Thus, whilst involving limited mechanical expenditure and low energy costs, the water is rapidly purified in a single passage through the apparatus used in that the impurities are chemically converted in surprisingly rapid manner into gaseous secondary products such as nitrogen and nitric oxides which are able to easily escape.

During nitrate breathing the water treated according to the invention is not only freed from nitrogen-containing compounds, by converting into gaseous secondary products, but in addition other dissolved gases such as chlorine, carbon-dioxide etc. are rapidly expelled in the system which is responsible for ammonification and nitrification in the presence of a normal atmosphere. This is particularly the case if a series of flat containers is used which can advantageously also be employed in the system which physically expels the oxygen and in the chemical neutralisation system.

Thus, when performing the process according to the invention, the purification processes are completed within a few minutes compared with the considerable time involved when using processes employing slow filters for removing dissolved nitrogen compounds from the water. The initial water can be, for example, waste water resulting from a normal purification process in sewage treatment plants. A further feature of the process of the invention is that it operates much more cheaply in the biological purification stage than in the known processes involving chemical purification.

On the basis of the above teaching, the expert is able to modify the process of the invention as a funtion of the particular water purification problems without passing beyond the scope of the invention. Thus, if, for example, the water contains no organic nitrogen compounds but only nitrates, nitrites and ammonium compounds, ammonification is unnecessary (conversion of organic nitrogen compounds into ammonium compounds). However, the nitrification process is necessary in this case in order to oxidise the ammonium compounds during an oxidation process. However, if there are only nitrates and nitrites in the water to be purified, the nitrification process is also superfluous because it would then merely represent an additional expenditure to convert the nitrites into nitrates which subsequently via the intermediate stage of nitrites would be converted into gaseous secondary products (nitrogen, nitric oxides) in the biological reduction system. These statements merely serve to show that the process of the invention can also advantageously be modified if the water to be purified does not contain all conventional impurities.

BRIEF DESCRIPTION OF THE DRAWINGS

Hereinafter advantageous developments of the apparatus for performing the process for removing impurities dissolved in water are explained with reference to the attached drawings, wherein show.

DETAILED DESCRIPTION OF THE DRAWINGS

Figure 1:
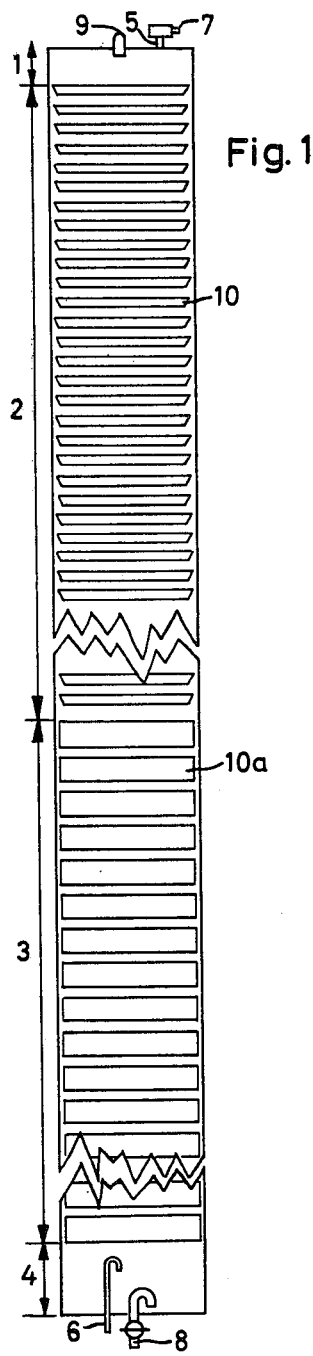
FIG. 1, a longitudinal section through a part of the inventive apparatus, which inter alia comprises the system which physically expels the oxygen and the system which biologically reduces the nitrates.

According to FIG. 1, the waste water to be purified passes via a water inlet 9 into the water distribution chamber 1. It subsequently flows via the containers 10 of the system 2 which physically expels the oxygen and via containers 10a of the system which biologically reduces the nitrates into a gas distribution chamber 4, from where it is removed via a water outlet 8. A gaseous medium called a nitrogen atmosphere is passed through a closed tube containing the two above-mentioned systems in the opposite direction to the water flow and passes out of gas outlet 5 which can be closed by means of a nonreturn valve 7.

Figure 2:
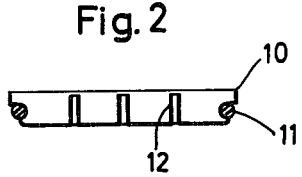
FIGS. 2, 3 and 4, the flat containers used in the system for physically expelling the oxygen of FIG. 1.
Figure 3:
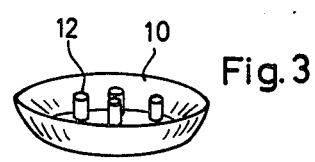
Figure 4:
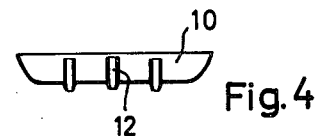

The flat containers 10 of the system for physically expelling the oxygen and whose diameter is only slightly smaller than that of the diameter of the inner wall of the said tube are shown in detail in FIGS. 2-4. The inflowing water is distributed in container 10 before it flows into the next container via overflows 12. The surface area which is enlarged due to the containers 10 facilitates exchange between the nitrogen atmosphere used and the water, whereby the oxygen expelled from the water escapes via the gas outlet 5 mentioned with reference to FIG. 1, together with the excess nitrogen. These containers can also be used in the above-described neutralising system. A rubber gasket 11 is used for sealing purposes.

The bodies 10a shown in FIG. 1 which are associated with the system 3 which biologically reduces the nitrates have the same diameter as the above-mentioned flat containers 10. They constitute inoculated porous bodies.

Figure 5:
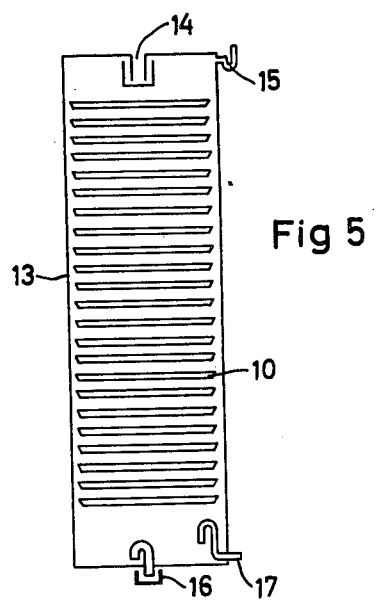
FIG. 5, a longitudinal section of a chemical neutralisation device of an embodiment of the apparatus according to the invention.

FIG. 5 shows an additional device 13 for the chemical neutralisation of alkaline substances given off during nitrification. Flat containers 10 with overflows 12 (cf. FIGS. 2-4) are arranged perpendicular to the water flow in said device 13. The water to be purified is introduced into device 13 from above via water inlet 14, and is drained off at the bottom via water outlet 16. Carbon-dioxide is introduced into device 13 via a gas inlet 17 in the opposite direction to the water flow, and is removed in the upper part thereof via the gas outlet 15.

Figure 6:
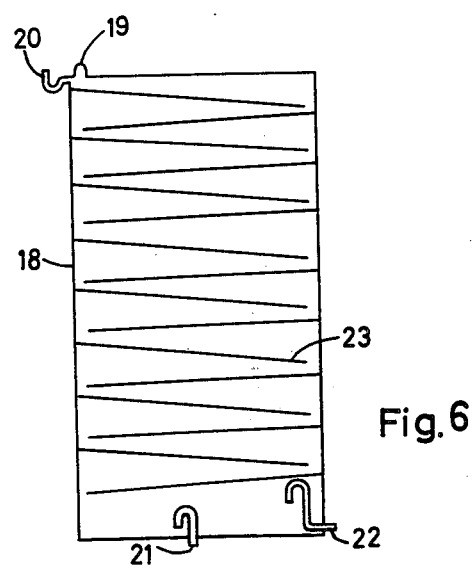
FIG. 6, a longitudinal section through a further chemical neutralisation device in an embodiment of the inventive apparatus.

FIG. 6 shows a further device 18 suitable for neutralising the alkaline substances given off during nitrification. The water is fed in via water inlet 19 and is drained off via water outlet 21, whilst carbon-dioxide flows into the container via gas inlet 22 and flows out via gas outlet 20. A series of surfaces 23 are inclined relative to the water flow in container 18. In the case of a corresponding interchange of gas (carbon-dioxide by a gaseous medium covered by the term nitrogen atmosphere as used in the present invention), device 18 can be used in the same way as device 2 for physically expelling oxygen and as a device for removing gases.

Figure 7:
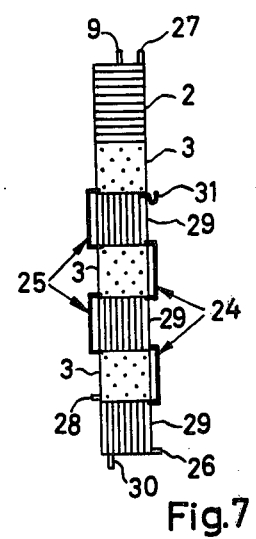
FIG. 7, a schematic representation of a combination of a system for biologically reducing nitrates with a chemical neutralisation system.

FIG. 7 shows a schematic combination of a system 2 for physically expelling oxygen with in each case three systems for nitrate breathing and chemical neutralisation, whereby the water to be purified is fed into the oxygen expulsion device 2 via water inlet 9 and subsequently passes into a system 3 for biologically reducing nitrates which is followed by a total of three systems 29 for the chemical neutralisation of alkaline substances with in each case intermediately connected systems 3 for the biological reduction of nitrates. The water is finally discharged via water outlet 30. Carbon-dioxide is introduced via gas inlet 26 and by passes system 3 for biologically reducing the nitrates by means of by passes lines 24. The gas which represents the nitrogen atmosphere passes via gas inlet 28 into the lowermost system 3 for the biological reduction of nitrates, by passes the chemical neutralisation system 29 via by pass lines 25 before being introduced into the following system 3 for the biological reduction of nitrates. Carbon-dioxide is removed via line 31 and the nitrogen-containing gaseous phase (nitrogen atmosphere) via gas outlet 27.

The following Example serves to illustrate the present invention.

EXAMPLE 500 liters of water containing organic nitrogen compounds, nitrates and nitrites were fed hourly in a downwardly flowing manner into the inventive apparatus for removing impurities dissolved in the water. This apparatus comprised, for example, a tube having a diameter of 0.30 m containing the ammonification and nitrification, oxygen expulsion and nitrate breathing systems. The first system (ammonification/nitrification) extended over a length of 1 m, the part used for physically expelling the oxygen had a height of 2 m and the part for biologically reducing the nitrates a height of 0.75 m. A mixture of nitrogen and hydrogen was used as the nitrogen atmosphere. 20 Liters of nitrogen and 30 liters of hydrogen were consumed hourly. The water downwardly flowing through the apparatus and discharged at the bottom was completely free from nitrogen compounds. In all, 50 g of nitrates were converted into gaseous products daily and removed.

We claim:

1. A process for treating water containing impurities including organic nitrogen compounds, nitrates or ammonium compounds, said process comprising the successive steps of:
    (1) passing the water to be purified through a complete ammonification and nitrification system containing aerobic bacteria in the presence of ambient, oxygen-containing air;
    (2) passing the water treated in step (1) downwardly through an oxygen removal system which countercurrently passes a stream of nitrogen through the treated water to physically remove all, or substantially all, of the oxygen dissolved in the treated water;

(3) downwardly passing the oxygen-free treated water of step (2) into a biologically active nitrate reduction system containing denitrifying anaerobic bacteria and a nitrogen atmosphere and thereby reducing the nitrate impurities present in the water;

(4) separating and removing gases generated during the impurity-removing steps; and thereafter (5) recovering the thus purified water.

2. The process according to claim 1 wherein the water to be purified in steps (2), (3) or both is passed through a nitrogen atmosphere consisting of nitrogen with hydrogen or nitrogen with methane.

3. The process according to claim 1 wherein the system for biologically reducing nitrates contains a plurality of porous bodies colonized with anaerobic bacteria.

4. The process according to claim 3 wherein each porous body is treated with a Trautwein nutrient solution.

5. The process according to claim 1 wherein the system of step (1) contains a plurality porous bodies inoculated with an aerobic ammonifying or nitrifying bacterial culture.

6. The process according to claim 5 wherein the porous bodies are treated with a solution preservable at 1.5 to 3° C. containing 10 liters of mains water, 500 g of pond sludge, 10 g $(NH_4)_2SO_4$, 10 g $NaNO_2$, 5 g $K_2HPO_4$, 20 g NaCl, 50 g $CaCO_3$, 2 g $MgSO_4$, 0.5 g $FeSO_4$ and 10 g $CO(NH_2)_2$, which after adjusting to a pH value of 6.5 was incubated for 10 days accompanied by ventilation.

7. The process according to claim 1 wherein water treated according to step (3), where the nitrates are biologically reduced also contains alkaline substances, is further treated with carbon dioxide, the carbon dioxide being subsequently removed after neutralization of the water, and the water is recycled to the nitrate reduction to complete biological reduction in the presence of a nitrogen atmosphere and in the absence of carbon dioxide.

8. The process according to claim 7 wherein a plurality of bological nitrate reductions and subsequent carbon dioxide reductions are alternated dependent on the degree of pollution of the water to be purified.

9. Apparatus for the treatment of water containing impurities to remove nitrates therefrom including:
an aerobic waste-water treatment means including an inlet for impurity-containing water, means for providing air into the treatment area and aerobic bacteria associated therewith such that the impurity-containing waste water is subjected to ammonification and nitrification, and an outlet for passing the nitrate-containing waste water to oxygen removal means for physically removing substantially all of the oxygen dissolved in said water including a waste water inlet positioned at the top of said means, a plurality of containers located within said oxygen removal means over which said water flow in a downward direction, and a nitrogen atmosphere inlet positioned at the base of said oxygen removal means directing the nitrogen atmosphere in an upward direction with respect to the downward flow of said water;

an anaerobic biological nitrate-reducing means positioned below the oxygen removal means including a waste water inlet positioned at the top of said nitrate reducing means, and a nitrogen atmosphere inlet positioned at the bottom of said nitrate reducing means together providing a downward flow of waste water and an upward flow of the nitrogen containing atmosphere;

each of said treatment means connected, one to the other, such that the water being purified therein flows in a downward direction.

10. The apparatus according to claim 9 wherein said oxygen removal means contains a series of flat containers with overflows positioned perpendicularly relative to the flow of water or a series of surfaces inclined relative to the flow of water.

11. The apparatus according to claim 9 further including neutralizing means for neutralizing alkaline substances released during nitrification, said neutralization means containing a series of flat containers having overflows therein and positioned perpendicularly relative to the flow of water positioned vertically within a fluid container means.

12. The apparatus according to claim 9 further including means for neutralizing alkaline substances released during nitrification including a series of opposing surfaces inclined with respect to the flow of water.

13. The apparatus according to claim 9 wherein said oxygen removing means includes a series of flat containers having overflows therein and positioned perpendicularly to the flow of water.

14. The apparatus according to claim 9 wherein said oxygen removing means includes a series of opposing surfaces inclined with respect to the flow of water.

15. A nitrate-removing waste water treatment apparatus comprising, in combination:
inlet means for introducing a waste water containing organic nitrogen compounds, nitrates, ammonium compounds and dissolved oxygen therein into said apparatus;

oxygen removal means for physically removing substantially all of the oxygen dissolved in said water including a waste water inlet positioned at the top of said means, a plurality of containers located within said oxygen removal means over which said water flows in a downward direction, and a nitrogen atmosphere inlet positioned at the base of said oxygen removal means directing the nitrogen atmosphere in an upward direction with respect to the downward flow of said water;

first anaerobic biological nitrate-reducing means positioned below the oxygen removal means including a waste water inlet positioned at the top of said nitrate reducing means, and a nitrogen atmosphere inlet positioned at the bottom of said nitrate reducing means together providing a downward flow of waste water and an upward flow of the nitrogen containing atmosphere;

first neutralizing means positioned below said first nitrate reducing means for reducing alkaline substances produced in said nitrate-reducing means including a carbon dioxide inlet positioned at the bottom of said neutralizing means providing for an upward flow of carbon dioxide against the downward flow of waste water;

second anaerobic biological nitrate-reducing means positioned below the first neutralizing means including a waste water inlet positioned at the top of said nitrate reducing means and a nitrogen atmosphere inlet positioned at the bottom of said nitrate reducing means together providing a downward flow of waste water and an upward flow of nitrogen containing atmosphere;

second neutralizing means positioned below said second nitrate-reducing means for reducing alkaline substances produced in said nitrate-reducing means including a carbon dioxide inlet positioned at the bottom of said neutralizing means providing for an upward flow of carbon dioxide against the downward flow of waste water;

third anaerobic biological nitrate-reducing means positioned below said second neutralizing means including a waste water inlet positioned at the top of said nitrate reducing means and a nitrogen atmosphere inlet positioned at the bottom of said nitrate reducing means together providing a downward flow of waste water and an upward flow of the nitrogen-containing atmosphere;

third neutralizing means positioned below said third nitrate reducing means for reducing alkaline substances produced in said nitrate-reducing means including a carbon dioxide inlet positioned at the bottom of said neutralizing means providing for an upward flow of carbon dioxide against the downward flow of waste water;

each of said treatment means connected, one to the other, such that the waste water being purified therein flows in a downward direction.

* * * * *